United States Patent [19]

Watanabe et al.

[11] 4,259,001
[45] Mar. 31, 1981

[54] ACTUATING LEVER STOPPING DEVICE OF A CAMERA SHUTTER MECHANISM

[75] Inventors: Masanori Watanabe; Tadashi Nakagawa; Ichiro Nemoto; Eiichi Onda; Mitsuo Koyama, all of Yotsukaido, Japan

[73] Assignee: Seiko Koki Kabushiki Kaisha, Tokyo, Japan

[21] Appl. No.: 755,452

[22] Filed: Dec. 29, 1976

[30] Foreign Application Priority Data

Dec. 29, 1975 [JP] Japan .......................... 50/180022[U]

[51] Int. Cl.$^3$ .............................................. G03B 9/08
[52] U.S. Cl. ..................................... 354/266; 354/246
[58] Field of Search ............... 354/266, 245, 246, 252, 354/251, 248, 249

[56] References Cited

U.S. PATENT DOCUMENTS

| | | | |
|---|---|---|---|
| 3,852,785 | 12/1974 | Ogihara et al. ...................... | 354/239 |
| 3,925,799 | 12/1975 | Nakatani .......................... | 354/266 X |
| 3,946,413 | 3/1976 | Onda et al. ........................... | 354/252 |
| 4,110,772 | 8/1978 | Nakagawa et al. .................. | 354/246 |

Primary Examiner—John Gonzales
Attorney, Agent, or Firm—Robert E. Burns; Emmanuel J. Lobato; Bruce L. Adams

[57] ABSTRACT

A camera shutter mechanism comprises a shutter actuating lever movable between a cocked position and a rest position to actuate a part of the camera shutter mechanism, and a cocking lever having an abutting portion for abutting the actuating lever to move the latter from the rest position thereof into the cocked position thereof. The cocking lever and the actuating lever together include a locking mechanism which releasably locks the actuating lever in the rest position. The locking mechanism and the abutting portion are arranged so that when the actuating lever approaches its rest position, it engages the abutting portion so as to rotate the cocking lever into a position in which the locking mechanism locks the actuating lever.

6 Claims, 2 Drawing Figures

ACTUATING LEVER STOPPING DEVICE OF A CAMERA SHUTTER MECHANISM

BACKGROUND OF THE INVENTION

The present invention relates to an actuating lever stopping device of a camera shutter mechanism.

As a means of accurately stopping operating of a member for adjusting the exposure of a shutter at the operation finishing position thereof, various devices have been known for a usual operation member. Particuraly, each member of the shutter is operated in connection with a plurality of members at a high speed, so that, in order to secure a stable operation, it is required that each member stops at its operation finishing position without causing any rebounding.

There is a similar demand for a shutter applicable to modern miniature and low-price camera.

SUMMARY OF THE INVENTION

To cope with said demand for the small-sized camera of low price, this invention proposes a stopping device with minimum number of members and less defects, by interconnection of the shutter mechanism.

The first object of this invention is to offer an actuating lever stopping device applicable to a small-sized shutter.

The second object of this invention is to offer an actuating lever stopping device applicable to a low price shutter.

The third object of this invention is to offer an actuating lever stopping device that is steady in operation and has few defects. The fourth object of this invention is, by constructing the member controlling the exposure operation and its cocking member so as to operate together, rebounding of the actuating member from the cocking member is prevented. Therefore, it is possible to offer an actuating lever stopping device for prevention of rebounding without adding any parts for that purpose.

According to this invention, an actuating lever stopping device for a camera shutter can be offered in such a way that, with a view of the shutter exposure operation, a shutter actuating lever movable between a cocked position and a rest position to actuate a part of the camera shutter mechanism, and a cocking lever having an abutting portion which abuts the actuating lever to move the latter from the rest position thereof into the cocked position thereof. The cocking lever and the actuating lever together include a locking mechanism which releasably locks the actuating lever to the cocking lever in the rest position. The arrangement of the locking mechanism and the abutting portion is such that when the actuating lever approaches its rest position, it abuts the abutting portion so as to rotate the cocking lever into a position in which the locking mechanism is actuated to lock the actuating lever at said locking portion.

The stopping device according to this invention, when the actuating lever approaches its rest position, it rides over the locking mechanism and is subjected to friction braking thereby.

Further, in the stopping device according to this invention, said actuating lever engages with said abutting portion of said cocking lever in the operation finishing region of said actuating lever, and said locking portion displaces said actuating lever in the locking direction.

Now, detailed description is given below reffering to the drawings showing an embodiment of this invention.

DETAILED DESCRIPTION OF THE INVENTION

Figure 1:
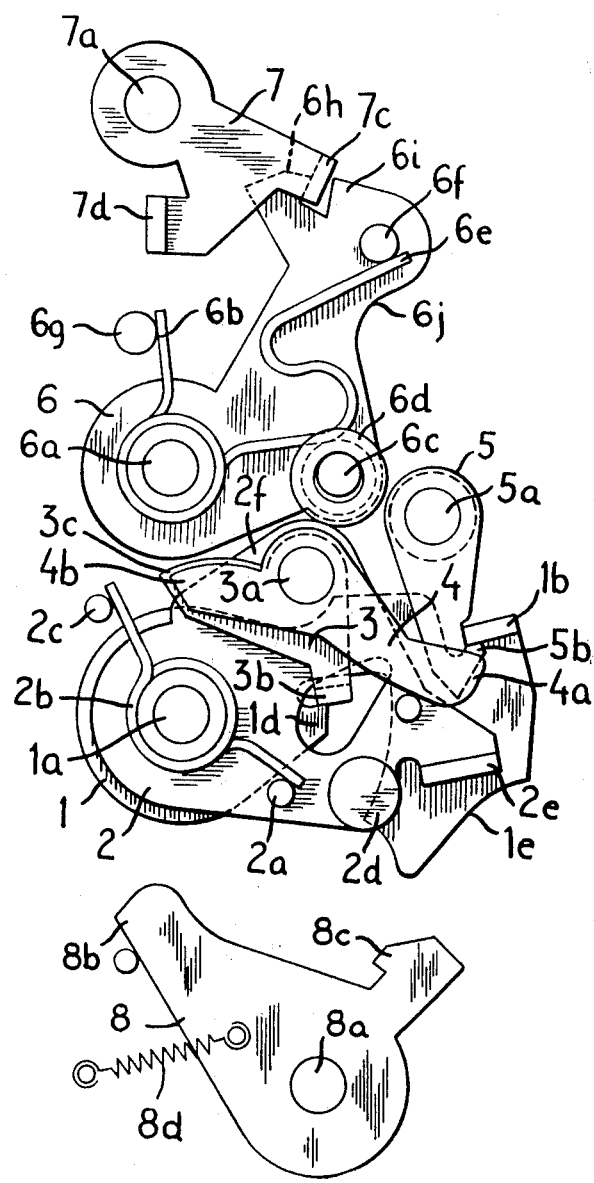

In FIG. 1, the member or elements shown are supported on a base plate provided with a shutter opening for film exposure (not shown in the figure). An opening member 1 is rotatably supported by a shaft 1a, and provided with a curved portion 1b at its right end and a hook portion 1d at its center.

An actuating member 2 is provided with a fixed pin 2a and, by a spring 2b acting thereon, a clockwise turning force is developed and applied to the shaft 1a. And the other end of the spring 2b is fixed with a fixing pin 2c. In the right portion of the actuating member 2 is formed an arch portion 2d and a curved portion 2e, and on the outer periphery thereof is formed a cam 2f. On the actuating member 2 is rotatably supported a connecting hook 3 by a shaft 3a, and a lower side curved portion 3b that penetrates a part of the actuating member engages with the hook portion 1d of the opening member 1, whereby a clockwise turning spring (not shown in the figure) is energized in a form provided with a projection 3a at the left end.

A drive transmission member 4 has the shaft 3a extending therethrough, and the right end portion 4a is formed engageable with the curved portion 1b, and the left end portion 4b is formed to lie wholly within the boundary of the projection 3c.

An opening hook 5 is rotatably supported by a shaft 5a, and a hook portion 5b engages with the curved portion 1b, and a counter-clockwise turning spring (not shown in the figure) is energized. Since the spring 2b of the actuating member 2 acts on the hook portion through the connecting hook 3, the curved portion 1b is locked by the opening hook 5 against rotating under the influence of the spring 2b.

A closing member 6 is rotatably supported by a shaft 6a, and biased by a clockwise turning force developed by a spring 6. A pin 6c projects from the closing member 6, and a pipe 6d or bushing is inserted on the pin 6c with a clearance. On the outer periphery acts a spring 6b, the free end 6e thereof is bent and engages with another pin 6f. The other end of the spring 6f is fixed to a fixing pin 6g. And the pipe 6d is projected into the working region of the cam 2f of the driving member 2. At the right upper end of the closing member 6 are formed a hook portion 6h, a stopping portion 6i, and a concave portion 6j.

A closing hook 7 is rotatably supported by a shaft 7a, and a clockwise turning spring (not shown in the figure) is energized. And a lower curved portion 7c locks the hook portion 6h and an upper curved portion 7d is provided.

A cocking lever 8 is rotatably supported by a shaft 8a, and a cam portion 8b and a hook portion are formed, thereby a clockwise turning coil spring 8d is energized.

Next, operation of the shutter mechanism is described.

When the opening hook 5 is, in connection with a shutter release, turned clockwise from the state shown in FIG. 1 against the spring, the hook portion 5b releases the curved portion 1b and releases the opening member 1 from the locked condition. When the opening member 1 is released, since the opening member 1 is operatively connected as one body with the actuating member 2 through the connecting hook 3, the opening member 1 turns clockwise by the spring 2b to open an opening (not shown in the figure), and then an exposure is started. At the termination period of operation of the actuating member 2, the curved portion 2e engages with the locking portion 8c of the cocking lever 8, making the cocking lever 8 turn clockwise against the spring. Then the arch portion 2d makes the cocking lever 8 turn counterclockwise by pushing its cam portion 8b. Therefore, the opening member 1 is decelerated in the region of completion of the shutter opening operation by engagement with the locking portion 8c and the cam portion 8b, and at the same time is locked by the concave portion of the locking portion 8c and rebounding at the stopping portion after traveling with high speed is prevented.

Figure 2:
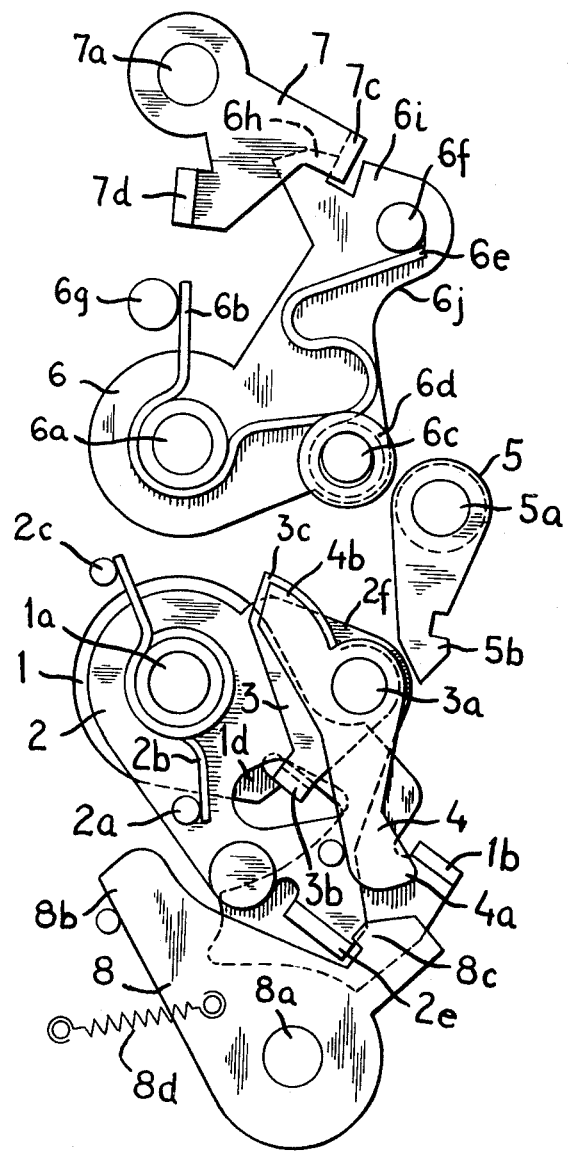

Although not shown in the figure, there is provided a separate stopping device that regulates the rest position of the opening member 1. FIG. 2 shows a state of the opening member 1 at the end of its operation.

By a wellknown method, the curved portion 7d of the closing hook 7 is, after a required exposure time has elapsed, made to turn counterclockwise against the spring, making the lower curved portion 7c release the hook portion 6h and release the closing member 6 from the locked condition.

When the hook portion 6h is released, the closing member 6 turns clockwise by the spring 6b and closes the opening (not shown in the figure), thereby finishing the exposure. In the region of completion of the operation of the closing member 6, the bushing 6d engages with the projection 3c of the connecting hook 3 to make the connecting hook 3 turn counterclockwise around the shaft 3a, releasing the engagement of the curved portion 3b with the hook portion 1d, as well as the connection of the opening member 1 with the actuating member 2. When the closing member 6 is turned further, the bushing 6d engages with the left end portion 4b of the drive transmission member 4 to make the drive transmission member 4 turn counterclockwise around the shaft 3a, and, by pushing the curved portion 1b with the right end portion 4a, makes the opening member 1 turn counterclockwise to displace in the direction toward the position corresponding to the opening again. In case the pipe 6d returns for the purpose of making the opening member 1 close the opening again through the drive transmission member 4, since the closing member 6 has already closed the opening, there occurs no influence on the exposure operation, and by the abutting of the concave portion 6j against the outer periphery of the shaft 5a, the operation of the closing member 6 is completed this completes the shutter operation.

In order to charge the shutter for the next exposure, the cocking lever 8 is turned clockwise around the shaft 8a against the spring 8d, and after the locking portion 8c has released the curved portion 2e, the actuating member 2 is turned counterclockwise against the spring 2b by the engagement of the cam portion 8b with the projection 2d, and at the same time the cam portion 2f engages with the bushing 6d, whereby the bushing 6d is made to turn counterclockwise around the shaft 6a.

The bushing 6d pushes the spring 6b, and the free end 6e pushes the pin 6f to make the closing member 6 turn counterclockwise around the shaft 6a.

When the cocking lever 8 is made to turn clockwise further, the actuating member 2 and the closing member 6 are turned by the relation mentioned above, and in the course of the counterclockwise turning of the actuating member 2, the curved portion 3b of the connecting hook 3 accompanies the hook portion 1d of the opening member 1, and in the region of completion of the operation of the cocking lever 8, the curved portion 3b is locked by the hook portion 1d, and the curved portion 1b of the opening member is locked by the hook portion 5b of the opening hook 5. After the hook portion 6h of the closing member has been locked by the curved portion 7c, the cocking lever 8 returns to assume the state shown in FIG. 1.

In the abovementioned embodiment, the rebound prevention device is comprised of the interconnection of the cocking lever and the actuating member, and this constitution is brought about by an interconnection between the member operated for charging the actuating member and thereby charged actuating member, such as the cocking lever and the opening member or the closing member and the actuating member.

As is evident from the above description, according to this invention, since the bounding of a member operating for the shutter operation is prevented at rest by the mutual connection of the constitution members of the shutter, it is possible to miniaturize the shutter as compared with a conventional shutter which is locked by a separate member, moreover, since such a separate member is not needed, the manufacturing cost is reduced. In addition, since the actuating member is turned by sliding on the inclined surface of the locking portion, it is stopped by engagement with the cam-formed abutment portion after being decelerated by a frictional braking, so that the vibration at the stopping moment of operation is reduced, and thereafter the locking occurs at the locking portion, making the operation more securely and contributing to an affective means of this invention.

We claim:

1. In a camera shutter mechanism: a shutter actuating lever mounted for rotation about an axis and movable between a cocked position and a rest position to actuate the camera shutter mechanism; and a cocking lever positioned adjacent said actuating lever when the same is in the rest position, mounted for rotation about an axis fixed relative to the axis of rotation of said actuating lever and movable to abut said actuating lever and move said actuating lever from the rest position to the cocked position, said cocking lever including abutting means for abutting said actuating lever for moving said actuating lever from the rest position to the cocked position when said cocking lever is moved, said cocking lever and said actuating lever together including locking means for releasably locking said actuating lever to said cocking lever when said actuating lever is in the rest position to prevent said actuating lever from rebounding from the rest position and for releasing said actuating lever from said cocking lever when said cocking lever is moved to move said actuating lever to the cocked position, and said abutting means and said locking means relatively positioned so that said actuating lever bears against said abutting means and moves said cocking lever in a direction to actuate said locking means and lock said actuating lever in the rest position when said actuating lever is biased toward the rest position before said cocking lever is moved to release said locking means.

2. In a camera shutter mechanism according to claim 1: wherein said locking means includes braking means for frictionally braking the movement of said shutter actuating lever from the cocked position to the rest position as said actuating lever approaches the rest position.

3. In a camera shutter mechanism according to claim 1: wherein said actuating lever is a plate-like member having a pair of opposed end portions and is mounted for pivoting about one of said end portions; wherein said cocking lever is a plate-like member having a pair of opposed end portions and is mounted for pivoting about one of said end portions; and wherein said abutting means is comprised of the other of said end portions of said cocking lever, and said locking means is comprised of a hook-shaped protrusion protruding from said cocking lever end about which said cocking lever pivots and a tab protruding from the other end of said actuating lever and positioned to be engaged by said hook-shaped protrusion when said actuating lever is in the rest position.

4. In a camera shutter mechanism according to claim 3: wherein said hook-shaped protrusion includes a surface portion positioned to be struck by said tab as said actuating lever approaches the rest position for frictionally decelerating said actuating lever.

5. In a camera shutter mechanism according to claim 2: wherein said braking means is comprised of a surface portion of said cocking lever positioned to be struck by said shutter actuating lever for displacing said cocking lever as said shutter actuating lever travels from the cocked position to the rest position, and a spring for biasing said cocking lever to resist displacement as said surface portion is struck by said shutter actuating lever.

6. In a camera shutter mechanism according to claim 5: wherein said surface portion of said cocking lever is oriented so that said shutter actuating lever strikes and travels in contact with said surface portion as said shutter actuating lever travels from the cocked position to the rest position, and said spring biasing said cocking lever to resist displacement is effective to enhance friction forces between said surface portion of said cocking lever and said shutter actuating lever for decelerating said shutter actuating lever.

* * * * *